United States Patent
Deckers et al.

(12) 
(10) Patent No.: US 6,887,955 B2
(45) Date of Patent: May 3, 2005

(54) METHOD FOR HIGH PRESSURE POLYMERIZATION OF ETHYLENE

(75) Inventors: Andreas Deckers, Flomborn (DE); Frank Olaf Maehling, Mannheim (DE); Georg Groos, Dannstadt-Schauernheim (DE); Wilhelm Weber, Neustadt (DE); Gernot Koehler, Meckenheim (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

(21) Appl. No.: 10/486,409

(22) PCT Filed: Aug. 13, 2002

(86) PCT No.: PCT/EP02/09033

§ 371 (c)(1),
(2), (4) Date: Feb. 11, 2004

(87) PCT Pub. No.: WO03/018646

PCT Pub. Date: Mar. 6, 2003

(65) Prior Publication Data

US 2004/0181015 A1 Sep. 16, 2004

(30) Foreign Application Priority Data

Aug. 20, 2001 (DE) .......................... 101 39 374

(51) Int. Cl.$^7$ .................................................. C08F 2/38
(52) U.S. Cl. .............................. 526/79; 526/62; 526/64
(58) Field of Search ................................. 526/64, 79, 62

(56) References Cited

U.S. PATENT DOCUMENTS

| | | | | |
|---|---|---|---|---|
| 3,736,305 A | * | 5/1973 | Kinkel et al. | .................. 526/67 |
| 3,842,060 A | * | 10/1974 | McDonald et al. | ........... 526/64 |
| 4,135,044 A | | 1/1979 | Beals | |
| 4,175,169 A | | 11/1979 | Beals et al. | |
| 5,100,978 A | | 3/1992 | Hasenbein et al. | |
| 6,509,103 B1 | | 1/2003 | Hueffer et al. | |
| 2003/0181632 A1 | | 9/2003 | Maehling et al. | |

FOREIGN PATENT DOCUMENTS

| | | |
|---|---|---|
| DE | 41 02 808 | 8/1992 |
| EP | 394 794 | 10/1990 |
| EP | 449 092 | 10/1991 |
| EP | 567 818 | 11/1993 |
| EP | 1 144 725 | 10/2001 |
| WO | 01/85807 | 11/2001 |

OTHER PUBLICATIONS

Ull.Enc.Tech.Chem.4thEd.vol. 19, 1988, 169–178.
Ull.Enc.Ind.Chem., 6th Ed.Table 7.

* cited by examiner

*Primary Examiner*—Fred Teskin
(74) *Attorney, Agent, or Firm*—Novak, Druce, DeLuca & Quigg

(57) ABSTRACT

In a process for the polymerization of ethylene and optionally further monomers in a high-pressure reactor at from 120 to 350° C. and pressures of from 1000 to 4000 bar, hydrogen is intermittently introduced into the reactor.

10 Claims, No Drawings

METHOD FOR HIGH PRESSURE POLYMERIZATION OF ETHYLENE

The present invention relates to a process for the polymerization of ethylene and optionally further monomers in a high-pressure reactor at from 120 to 350° C. and pressures of from 1000 to 4000 bar with intermittent addition of hydrogen, and to ethylene homopolymers and copolymers which can be prepared in this way.

High-pressure polymerization processes for preparing polyethylene and ethylene copolymers have been known for a long time (Ullmann's Encyclopädie der technischen Chemie, 4th Edition, Vol. 19/1980/pp. 169–178). Processes carried out in high-pressure tube reactors are particularly prevalent. Said processes are described, for example, in EP-A-449092, EP-A-394794, EP-B-567818 and DE-A-4102808. The quality of the products obtained and, in particular, the conversion of such high-pressure polymerization processes is limited, inter alia, by the effectiveness of the removal of heat from the exothermic polymerization reaction, with the achievable conversion generally increasing as the quantity of heat removed increases. Part of the heat evolved in the polymerization is removed via the reactor walls and can there be, for example, transferred to a cooling medium. A problem which frequently occurs is that, even at high temperatures and high pressures, high molecular weight polymer-rich flow boundary layers or even polymer deposits build up on the cooled inner walls of the reactor. Since polyethylene is a poor conductor of heat, this drastically reduces heat transfer and thus effective heat removal. If heat removal is insufficient, the ethylene can decompose as a result of the temperature increase. In addition, the conversion is greatly reduced by these polymer-rich flow boundary layers or polymer deposits. To avoid this, a wide variety of polymerization processes with specific temperature profiles have been developed. However, the processes are usually complicated and often associated with increased costs.

It is an object of the present invention to develop a process for the high-pressure polymerization of ethylene which is inexpensive and in which the conversion is increased.

U.S. Pat. No. 3,842,060 describes a process for the polymerization of ethylene in a tube reactor into which hydrogen is continuously introduced in an amount of from 10 to 150 ppm, based on the volume of the monomer stream, during the polymerization. This avoids polymer deposits during the polymerization and increases the conversion. However, a disadvantage is that part of the ethylene is hydrogenated to ethane during the polymerization.

It has now been found that the increase in the conversion persists even after the addition of hydrogen is stopped. The hydrogen consumption and also the proportion of ethane formed by hydrogenation of ethene could be reduced in this way.

We have accordingly found a process for the polymerization of ethylene and optionally further monomers in a high-pressure reactor at from 120 to 350° C. and pressures of from 1000 to 4000 bar, wherein hydrogen is intermittently introduced into the reactor.

The process of the present invention can be used both for the homopolymerization of ethylene and the copolymerization of ethylene with one or more other monomers, provided that these monomers can be free-radically copolymerized with ethylene under high pressure. Examples of suitable copolymerizable monomers are α, β-unsaturated $C_3$–$C_8$-carboxylic acids, in particular maleic acid, fumaric acid, itaconic acid, acrylic acid, methacrylic acid and crotonic acid, derivatives of α, β-unsaturated $C_3$–$C_8$-carboxylic acids, e.g. unsaturated $C_3$–$C_{15}$-carboxylic esters, in particular esters of $C_1$–$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and α-olefins such as propene, 1-butene, 1-pentene, 1-hexene, 1-octene or 1-decene. It is also possible to use vinyl carboxylates, particularly preferably vinyl acetate, as comonomers. N-butyl acrylate, acrylic acid or methacrylic acid is particularly advantageously used as comonomer. The proportion of comonomer or comonomers in the reaction mixture is from 1 to 45% by weight, preferably from 3 to 30% by weight, based on the amount of ethylene.

In the process of the present invention, the polymerization can be started by means of one or more initiators. Possible initiators are, for example, air, oxygen, azo compounds or peroxidic polymerization initiators. Initiation using organic peroxides represents a particularly preferred embodiment of the process of the present invention. Examples of suitable organic peroxides are peroxy esters, peroxy ketals, peroxy ketones and peroxy carbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butylperoxy diethyl acetate, tert-butylperoxy diethyl isobutyrate, 1,1-di(tert-butylperoxy)-3,3,5-trimethylcyclohexane, 1,1-di(tert-butylperoxy) cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane or 1,1-di(tert-butylperoxy) butane. Also suitable are azodicarboxylic esters, azodicarboxylic dinitriles, e.g. azobisisobutyronitrile, and also hydrocarbons which decompose to form free radicals and are known as C—C initiators, e.g. 1,2-diphenyl-1,2-dimethylethane and 1,1,2,2-tetramethylethane derivatives. It is possible to use both individual peroxides and, preferably, mixtures of various peroxides.

A large range of products comprising peroxides as mentioned above is commercially available, for example the various TRIGONOX® products and the various PERKADOX ® products from Akzo Nobel.

In a preferred embodiment of the process of the present invention, peroxidic polymerization inhibitors having a relatively high decomposition temperature are used. Suitable peroxidic polymerization initiators are, for example, 1,1-di(tert-butylperoxy)cyclohexane, 1,1-di(tert-butylperoxy) butane, tert-butyl peroxy-3,5,5-trimethylhexanoate, tert-butyl peroxybenzoate, 2,5-dimethyl-2,5-di-tert-butylperoxyhexane, tert-butylcumyl peroxide, di-tert-butylperoxide and 2,5-dimethyl-2,5-di(tert-butylperoxy) hex-3-yne; particular preference is given to using di-tert-butyl peroxide.

The initiators can be employed individually or as mixtures in concentrations of from 0.5 to 100 ppm, in particular from 0.5 to 50 ppm, based on the amount of monomer(s). It is often advantageous here to use the initiators in a dissolved state. Examples of suitable solvents are aliphatic hydrocarbons, in particular octane and isododecane. The peroxide mixtures are present in the solutions in proportions of from 2 to 65% by weight, preferably from 5 to 40% by weight and particularly preferably from 10 to 30% by weight.

In the process of the present invention, the molar mass of the polymers to be prepared can be controlled in a customary fashion by addition of molecular weight regulators. Examples of suitable regulators are aliphatic and olefinic hydrocarbons such as pentane, hexane, cyclohexane, propene, 1-pentene or 1-hexene, ketones such as acetone, methyl ethyl ketone (2-butanone), diethyl ketone or diamyl ketone, aldehydes such as formaldehyde, acet aldehyde or propionaldehyde and saturated aliphatic alcohols such as methanol, ethanol, propanol or butanol. Particular preference is given to using saturated aliphatic aldehydes, in particular propionaldehyde, or α-olefins such as propene or 1-hexene. The molecular weight regulator is preferably added to the reaction mixture upstream of the tube reactor. It can also be introduced together with the polymerization initiator at one or more points along a tube reactor.

The process of the present invention is usually carried out at pressures of from 1000 to 4000 bar, with pressures of from 1800 to 3500 bar being preferred and pressures of from 2000 to 3300 bar being particularly preferred. The temperatures are generally in a range from 120 to 350° C., preferably from 150 to 340° C. and very particularly preferably from 160° C. to 320° C., with the polymerization preferably being carried out at temperatures below 230° C. in the case of the copolymerization of ethylene with sensitive or highly regulating comonomers, in particular carboxylic esters.

Preference is generally given to a process in which the polymerization temperature is not above 310° C.

The flowing reaction mixture generally contains an amount of polyethylene in the range from 0 to 45% by weight, based on the total weight of the monomers, usually up to 40% by weight.

The hydrogen is introduced intermittently into the reactor, i.e. phases with hydrogen addition to the high-pressure reactor and phases without hydrogen addition alternate. In an advantageous embodiment of the process of the present invention, the hydrogen is introduced into the reactor for from 10 seconds to 5 hours, preferably from 1 minute to 1 hour and particularly preferably from 2 minutes to 20 minutes, and the reactor is subsequently operated without addition of hydrogen, usually for a period of from 1 to 50 times, preferably from 2 to 30 times and particularly preferably from 5 to 15 times, the time for which hydrogen was added. These phases with and without addition of hydrogen can be continually alternated. It is also possible for phases of different lengths with hydrogen addition and/or without hydrogen addition to follow one another. Preference is given to the phases with hydrogen addition each having the same length within a product setting. The same applies to the phases without hydrogen addition within a product setting.

In a preferred embodiment of the process of the present invention, the maximum concentration of hydrogen, based on the amount of ethylene fed in, in the reactor is in a range from 0.1 to 5000 ppm. In particular, small amounts of hydrogen display an optimal effect. In an advantageous embodiment, from 1 to 2000 ppm of hydrogen, preferably from 1 to 1000 ppm of hydrogen and particularly preferably from 10 to 300 ppm of hydrogen, in each case based on the amount of ethylene, are therefore fed in. In this embodiment, hydrogen is particularly preferably fed in intermittently over comparatively short periods of less than 20 minutes.

The process of the present invention can be carried out in all customary high-pressure reactors. Since deposit formation is of particular concern in high-pressure tube reactors because of the large reactor surface area of these reactors, the process of the present invention can be used particularly advantageously in high-pressure tube reactors.

For the purposes of the present invention, tube reactors are tubular polymerization vessels whose length-to-diameter ratio of the pressure-rated reactor tubes is generally in the range from 10 000:1 to 60 000:1, particularly preferably from 15 000:1 to 35 000:1. In any case, these tubular reactors have a length-to-diameter ratio of >1000:1. Information about high-pressure ethylene polymerization processes in which tube reactors are employed may be found, for example, in Ullmanns Enzyklopädie der technischen Chemie, 1980, 4th Edition, Volume 19, pp. 167–178, Verlag Chemie GmbH, 6940 Weinheim.

It is possible to use all known types of reactor, for example reactors with or without cold gas injection, reactors with pressurized water cooling, which may also be segmented, etc., as are known to those skilled in the art.

In a preferred embodiment, polymerization initiator is fed in at a plurality of points, e.g. from 2 to 6 points along the tube reactor, so that from 2 to 6 reaction zones are obtained. The term reaction zone refers to the zone commencing at the point of initiator introduction to just before the next point of initiator introduction. Polymerization initiator is preferably fed in at from 2 to 5 points.

The monomer and/or comonomer can be fed in one or more steps. In a preferred process, the total amount of monomer and, if desired, comonomer is fed in at the reactor inlet. In a further preferred process, the tube reactor has at least two reaction zones and additional cooled or preheated monomer and/or cooled or preheated comonomer is introduced as a fresh gas stream before or up to the beginning of each reaction zone (multiple cold gas injection). Here, preference is given to over 50% of the total amount of monomer and optionally comonomer being fed in at the reactor inlet. The addition of further monomer enables the flow rate to be increased and thus an additional contribution being made to the avoidance of deposit formation. The monomer or monomers can be fed in upstream of the further addition of initiator or together with the initiator. Preference is given to at least two successive reaction zones with the polymerization being started afresh in each stage by addition of the appropriate initiators.

Reactors suitable for carrying out the process include tube reactors which have a series of inlet points for the initiator and, if desired, for the introduction of further amounts of monomer(s). In general, the tube reactor has a length-to-diameter ratio of at least 10 000:1, preferably more than 15 000:1, at a length of from 120 to 2500 m. The tube reactor is advantageously in wound form.

Tube reactors in which each reaction zone has a relatively small tube diameter from the point of initiator introduction to the temperature maximum compared to the enlarged tube diameter in the subsequent cooling zone (from the temperature maximum to the next point of initiator introduction) can also be, operated using the process of the invention. In this way, a high conversion can be achieved at a relatively small pressure drop over the length of the reactor. Such reactors are described, for example, in U.S. Pat. No. 4,135,044 and U.S. Pat. No. 4,175,169. A combination of the process of the present invention with the reactors and processes described in WO 01/85807 is also possible.

In general, the mean residence time of the reaction mixture in the tube reactor is from 30 to 300 seconds, in particular from 60 to 180 seconds.

The process of the present invention can also be carried out in an analogous manner with a backmixed reactor connected upstream. After the polymerization in the backmixer has abated, the polymerization mixture together with unconsumed monomer is introduced via a high-pressure tube which may be connected to a heat exchanger, into the tube reactor where the process is continued as described above. In general, the mean residence time of the mixture in the backmixed reactor is from 10 to 100 seconds, in particular from 10 to 30 seconds, and the mean residence time in the tube reactor is from 10 to 200 seconds, in particular from 30 to 120 seconds.

The hydrogen can be fed in either only at the reactor inlet or at various points along the reactor. Thus, for example, the hydrogen can be fed in together with the monomer or monomers or at the points at which initiator is injected into the reactor. The hydrogen is preferably fed in together with the monomer or monomers. In a preferred embodiment, the total amount of hydrogen is mixed with fresh monomer in the compressor region, the mixture is compressed and subsequently fed into the reactor.

The optimum concentration of hydrogen in the reactor depends, however, on the respective pressure and temperature conditions and on the reactor geometry, or the material of which the interior walls of the reactor are constructed and the flow velocity through the reactor. It is therefore often more practical to determine the optimum concentration of hydrogen in each case for the respective reactor and the desired polymerization conditions. This can easily be done by a person skilled in the art. It is usual to begin at constant polymerization parameters and initially feed only very small amounts of hydrogen into the reactor. The temperature difference between the interior of the reactor and the outer surface of the pressure tube is then monitored by means of suitable temperature measuring devices, preferably at at least two successive positions along the reactor, preferably within a reaction zone, and the concentration of hydrogen is increased until both a maximum heat transfer and the desired product quality are achieved. The temperature measurement point is preferably located in the middle and/or at the end of a polymerization zone, since the temperature decrease resulting from the process of the present invention can be observed particularly well there. Since the conversion is also increased, this can also be used as a parameter for regulating the hydrogen concentration.

Furthermore, a process in which the temperature difference between the interior and the outer surfaces of the pressure tube is measured and the amount of hydrogen introduced into the reactor is regulated as a function of the temperature difference measured in this way has also been found to be particularly useful. In general, the outer surface is the cooling water jacket of the reactor. The object is to achieve a very small temperature difference, because this is an indicator of a minimal polymer-rich flow boundary layer or deposit layer on the interior surface of the reactor. The location of this temperature difference measurement depends on the way in which the reactor is operated. In the case of simple reactors in which the monomer stream is fed in only at one point at the reactor inlet, the reactor generally has a simple temperature profile so that one point for measuring the temperature difference can be sufficient. This is preferably at the end of the reaction zone. In the case of reactors in which initiator is injected at a plurality of points and particularly in the case of reactors in which cold monomer gas is fed in at a plurality of points, it is advantageous to carry out the measurement of the temperature difference at a plurality of points along the reactor, in particular in the middle and/or at the end of a polymerization zone.

Furthermore, it has been found that the observed effect makes possible particularly high conversion increases or longer intervals between the individual periods of hydrogen addition or requires smaller amounts of hydrogen to achieve an increase in conversion in the case of a tube reactor which is made of a nickel-containing steel or whose interior walls are coated with nickel. For this reason, a preferred embodiment provides for the interior walls of the high-pressure tube reactor to be coated with nickel. Coating can be carried out in all possible ways, for example chemically, electrolytically or by plating with subsequent auto-hooping. A method of applying a nickel coating chemically is described, for example, in WO 00/40775. In a further preferred embodiment, the high-pressure tube reactor or the interior surface of the high-pressure reactor is made of a material having a nickel content of from 0.1 to 100% by weight, preferably from 1 to 50% by weight and particularly preferably from 4 to 30% by weight. In a preferred embodiment, the high-pressure reactor is made of a steel having a nickel content of from 1 to 35% by weight, preferably from 1 to 18% by weight and particularly preferably from 1 to 10% by weight. The composition of steels is described, for example, in Ullmann 6th Edition, 2000 Electronic Release, Chapter: Steels.

After the last injection of polymerization initiator, the reaction mixture is cooled so that the product can be discharged from the reactor without thermal damage. The reaction mixture is discharged through a suitable high-pressure let-down valve at the outlet end of the tube reactor. After discharge of the reaction mixture, the polymer is separated from unreacted ethylene and any unreacted comonomer by depressurization, after which the monomers are generally recirculated to the reactor.

The invention further provides ethylene homopolymers and ethylene copolymers which can be prepared by the process of the present invention.

The homopolymers and copolymers of ethylene can be prepared reliably and precisely reproducibly by means of the process of the present invention without thermal decomposition of the monomers occurring in the reactors. The polymers of the present invention have densities of from 900 to 950 kg/m$^3$, preferably from 912 to 935 kg/m$^3$. The density can, for example, be influenced via the polymerization temperature and the polymerization pressure and/or the comonomer concentration. Its melt flow index MFI measured in accordance with ISO 1133 (190° C./2.16 kg) is in the range from 0.2 to 1000 g/10 min, in particular less than 100 g/10 min and particularly preferably less than 40 g/10 min. Films produced from the polymers of the present invention have excellent optical properties. In the above-described manner, it is possible to produce polymers having densities of above 925 kg/m$^3$ and conversions of above 25%. The homopolymers and copolymers of ethylene prepared by the process of the present invention are particularly useful for producing injection-molded products in the cosmetics, medical and food sectors, for example for pouring aids and welded closures of cartons or lids of combination packaging. Polyethylene waxes having a weight average molecular weight $M_w$ of not more than 20 000 g/mol, preferably not more than 10 000 g/mol and particularly preferably not more than 7500 g/mol, can readily be prepared by the process of the present invention. The molecular weight distribution ($M_w/M_n$) is in the range from 2 to 10. The melting points are in the range from 60 to 125° C., preferably from 80 to 120° C. However, the process of the present invention is well suited to preparing relatively high molecular weight polyethylene having a molecular weight $M_w$ of above 20 000 g/mol, preferably above 80 000 g/mol and particularly preferably above 120 000 g/mol. The molecular weight distribution of the relatively high molecular weight polyethylene prepared by the process of the present invention is in the range from 2 to 20. The melting points of the relatively high molecular weight polyethylene prepared by the process of the present invention are in the range from 80 to 135° C., preferably from 100 to 125° C.

A particular advantage of the process of the present invention is that only very small amounts of hydrogen are used and the process costs are therefore decreased significantly. Despite these small amounts of hydrogen, a significant increase in the conversion is achieved.

The process of the present invention has the further advantage that stable reactor operation can be maintained at unusually high maximum temperatures of up to 320° C. without decomposition occurring.

EXAMPLES AND COMPARATIVE EXPERIMENTS

Examples 1 to 5 and comparative experiment 1 (C1) were carried out in a tubular reactor having a length of 450 m and a length-to-diameter ratio of 29 300. Propionaldehyde was used as molar mass regulator to achieve the desired melt flow index of 36 g/10 min. The total amount of hydrogen was in each case added at the start of the tube reactor. The amount of hydrogen used and the time for which it was metered in (in each case between comparative example C1 and the respective example X corresponds to the time) are indicated in table 1.

The free-radical initiator used was a peroxide mixture of up to three organic peroxides (decomposing at low, intermediate and high temperature) and was brought directly to the feed points of the tube reactor by means of high-pressure piston pumps. The reaction zones were in each case divided into two separate, cooled zones. The water inlet temperature in each reaction zone was 170° C. The reactor is divided into three reaction zones having lengths of 170 m (reaction zone 1), 170 m (reaction zone 2) and 110 m (reaction zone 3). The oxygen-free ethylene (3.6 t/h) was compressed in a plurality of stages to the respective reaction pressure of 2250 bar and fed into the first reaction zone of the tube reactor together with the propionaldehyde.

The heat of reaction liberated in the polymerization was removed from the reaction mixture via a cooling medium circuit. The resulting polymer was separated from unreacted ethylene and other low molecular weight compounds in a customary and known manner in separators located downstream of the reactor.

A product having a density (measured in accordance with ISO 1183) of 0.922 g/cm³ and a melt flow index MFI (190° C./2.16 kg) (measured in accordance with ISO 1133) of 36 g/10 min was obtained in each case. The polymer and polymerization data are shown in table 1.

No polymer deposits were observed in the reactor.

Carrying out the reaction presented no difficulties and thermal decomposition of the ethylene did not occur. In addition, an increase in the conversion was observed. Owing to its excellent mechanical and optical properties, the ethylene homopolymer prepared according to the invention is very useful for the production of injection-molded products in the cosmetics, medical and food sectors.

Abbreviations used:
T RZ1in is the gas temperature at the beginning of reaction zone 1
T RZ1max is the maximum gas temperature in reaction zone 1
T RZ2in is the gas temperature at the beginning of reaction zone 2
T RZ2max is the maximum gas temperature in reaction zone 2
R RZ3in is the gas temperature at the beginning of reaction zone 3
T RZ3max is the maximum gas temperature in reaction zone 3
T RZ3out is the gas temperature at the end of reaction zone 3
Prod Production
Conversion: Production [t/h]/ethylene throughput [t/h]

The production parameters shown in the table were measured by the following methods:

TABLE 1

| | | | | | | | | | | | | |
|---|---|---|---|---|---|---|---|---|---|---|---|---|
| | | | | Polymerization data | | | | | | | | |
| Ex. | Time in min | Hydrogen in standard cbm/h | Hydrogen in ppm | T RZ1in in ° C. | T RZ1max in ° C. | T RZ2in in ° C. | T RZ2max in ° C. | T RZ3in in ° C. | T RZ3max in ° C. | T RZ3out in ° C. | Prod. in kg/h | Conversion in % |
| C1 | 0 | 0 | 0 | 172 | 286 | 249 | 294 | 251 | 295 | 271 | 1.21 | 33.6 |
| 1 | 10 | 4 | 100 | 171 | 286 | 241 | 293 | 240 | 293 | 268 | 1.31 | 36.4 |
| 2 | 20 | 4 | 100 | 172 | 285 | 240 | 294 | 240 | 294 | 268 | 1.32 | 36.7 |
| 3 | 40 | 4 | 100 | 171 | 286 | 239 | 293 | 239 | 295 | 267 | 1.34 | 37.2 |
| 4 | 60 | 0 | 0 | 170 | 284 | 241 | 295 | 240 | 294 | 268 | 1.33 | 36.9 |
| 5 | 90 | 0 | 0 | 171 | 286 | 243 | 294 | 243 | 294 | 269 | 1.30 | 36.1 |
| 6 | 120 | 0 | 0 | 171 | 285 | 243 | 295 | 244 | 294 | 269 | 1.30 | 36.1 |

We claim:
1. A process for the polymerization of ethylene and optionally further monomers in a high-pressure reactor at from 120 to 350° C. and pressures of from 1000 to 4000 bar, wherein hydrogen is intermittently introduced into the reactor.

2. A process as claimed in claim 1, wherein the polymerization is carried out in a tubular reactor having a length-to-diameter ratio of >1000:1.

3. A process as claimed in claim 1, wherein the hydrogen is introduced into the reactor for from 10 seconds to 5 hours and the reactor is subsequently operated without addition of further hydrogen for a period of from 1 to 50 times the time of hydrogen addition.

4. A process as claimed in claim 1, wherein the concentration of hydrogen, based on the amount of ethylene in the reactor, is in a range from 0.1 to 5000 ppm.

5. A process as claimed in claim 1, wherein the polymerization is initiated by means of peroxides.

6. A process as claimed in claim 2, wherein ethylene and optionally further monomers are fed into the reactor at a plurality of points along the tubular reactor.

7. A process as claimed in claim 1, wherein the pressure in the reactor is from 1800 to 3500 bar.

8. A process as claimed in claim 1, wherein the polymerization temperature is not above 310° C.

9. A process as claimed in claim 1, wherein the high-pressure reactor is made of a nickel-containing steel.

10. A process as claimed in claim 1, wherein the interior walls of the high-pressure reactor are coated with nickel or nickel-containing material.

* * * * *